United States Patent [19]

Grard et al.

[11] Patent Number: 5,121,451
[45] Date of Patent: Jun. 9, 1992

[54] OPTICAL HEAD WITH AN INTEGRATED ISOLATOR FOR COUPLING A SEMICONDUCTOR LASER TO A LIGHT GUIDE

[75] Inventors: Emmanuel Grard, Saint-Michel sur Orge; Daniel Mousseaux, Palaiseau; Jean-Luc Beylat, Paris; Jacques Auge, Saint Cheron; Jean-Jacques Guerin, Breuillet; Eugène Duda, Villebon-sur-Yvette, all of France

[73] Assignee: Alcatel Cit, Paris, France

[21] Appl. No.: 448,436

[22] Filed: Dec. 11, 1989

[30] Foreign Application Priority Data

Dec. 9, 1988 [FR] France ............... 88 16221
Jul. 26, 1989 [FR] France ............... 89 10057

[51] Int. Cl.⁵ ........................... G02B 6/32
[52] U.S. Cl. ........................... 385/33; 385/34; 385/49
[58] Field of Search ............ 350/96.15, 96.17, 96.18, 350/372, 373, 394, 395; 385/31, 33, 34, 49

[56] References Cited

U.S. PATENT DOCUMENTS

| | | | |
|---|---|---|---|
| 4,712,866 | 12/1987 | Dyott | 350/96.33 X |
| 4,770,505 | 9/1988 | Okazaki | 350/394 X |
| 4,867,524 | 9/1989 | Courtney et al. | 350/96.2 |
| 4,893,890 | 1/1990 | Lutes | 350/96.18 |
| 4,966,444 | 10/1990 | Droegemuller et al. | 350/96.13 X |

FOREIGN PATENT DOCUMENTS 0283227 9/1988 European Pat. Off.
2189900 11/1987 United Kingdom.

OTHER PUBLICATIONS

Electronics Letters, vol. 23, No. 5, Feb. 26, 1987, pp. 203-205, Stevenage, Herts, GB; K. Matsuda et al.: "Low-noise LD module with an optical isolator using a highly Bi-substituted garnet film".
Electronics Letters, vol. 22, No. 19, Sep. 11, 1986, pp. 1020-1022, Stevenage, Herts, GB; L. LI et al.: "Broadband metal/glass single-mode fibre polarisers".
Journal of Lightwave Technology, vol. LT-4, No. 2, Feb. 1986, pp. 236-245, IEEE, New York, U.S.; T. Sugie et al.: "Disbributed feedback laser diode (DFB-LD) to single-mode fiber coupling module with optical isolator for high bit rate modulation".

Primary Examiner—Frank Gonzalez
Assistant Examiner—Stephen W. Barns
Attorney, Agent, or Firm—Sughrue, Mion, Zinn, Macpeak & Seas

[57] ABSTRACT

A DFB laser (2) is coupled to a monomode line fiber (14) via an isolator constituted by a Faraday rotator crystal (4) and a polarizing fiber (10) which is welded to a fiber to be coupled (14). A focusing lens (8) is integrated in an intermediate block including the rotator crystal (4) and a permanent magnet (6). The invention is particularly suitable for making light-emitting heads for use in optical fiber telecommunications systems.

3 Claims, 4 Drawing Sheets

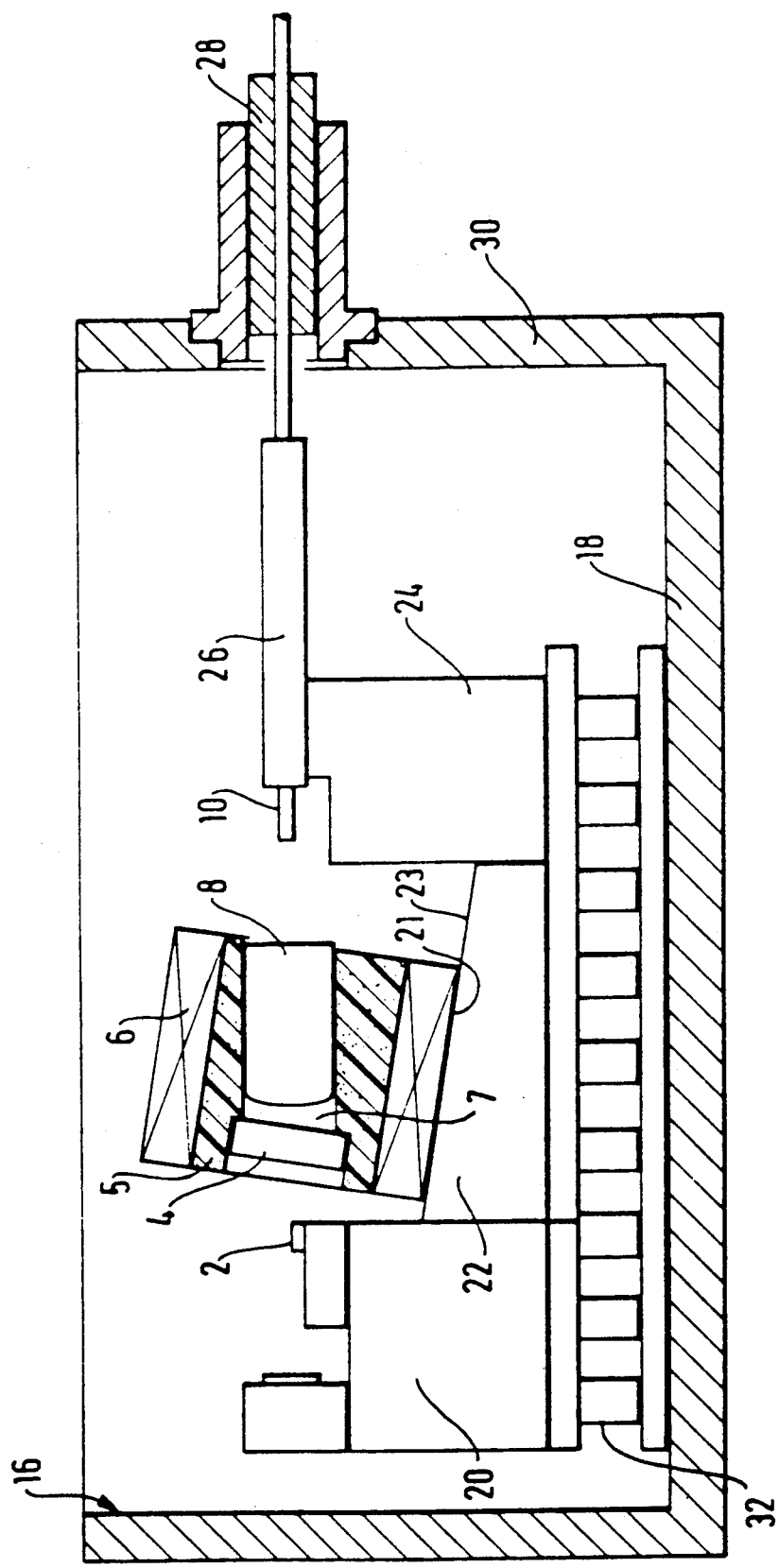

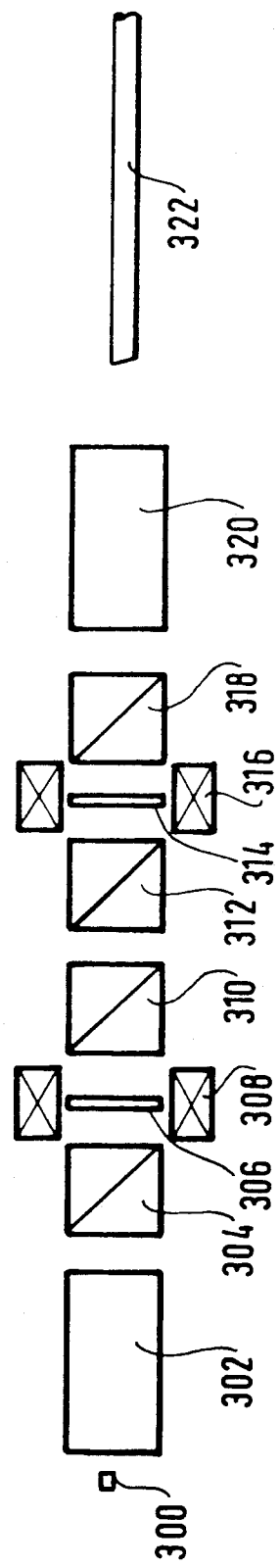
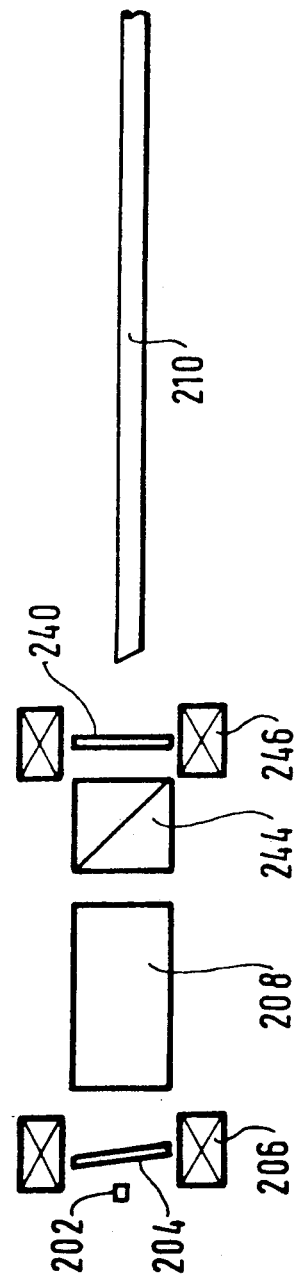

OPTICAL HEAD WITH AN INTEGRATED ISOLATOR FOR COUPLING A SEMICONDUCTOR LASER TO A LIGHT GUIDE

The present invention relates to an optical head including a semiconductor laser and serving to couple the laser to a light guide. The description below relates more particularly to the case where the guide to be coupled is constituted by an optical fiber. In this case, the fiber to be coupled is typically a monomode fiber.

BACKGROUND OF THE INVENTION

Such heads are utilized essentially in telecommunications for providing optical fiber transmission networks. Major research laboratories have performed numerous experiments on such networks. The experiments have been particularly directed to networks using coherent detection and they have shown that such networks have various advantageous over networks using direct detection:

the energy budget is improved thus making it possible to increase the range of point-to-point links, or the number of stations connected to a network; and multiplexing can be performed at closer wavelength intervals, thereby making it possible to increase the transmission capacity of a fiber or a network.

In order to obtain such advantages, the optoelectronic sources used in such networks must be high performance sources. In particular, they must have very narrow spectrum line widths. That is why these sources are currently constituted by lasers having distributed resonators, known as distributed feedback (DFB) lasers. Unfortunately, such lasers are detrimentally sensitive to interfering optical reflections which are difficult to avoid, e.g. backscattering in the fiber and reflections from non-optimized connections. The optical feedback from such reflections can disturb the essential characteristics of the source, such as monochromaticity, relative intensity noise (RIN), etc. . . . , and this can penalize the system or even prevent it from operating properly (asymptotic error rate greater than $10^{-9}$).

One known proposal for avoiding these drawbacks consists in integrating an optical isolator in the head in order to stop the light due to interfering reflections.

A first prior optical head using this disposition includes certain items in common with a head of the present invention, and these items are as follows:

a housing having a longitudinal direction with a front end and a rear end;

said semiconductor laser disposed inside said housing in order to emit a beam of useful light forwards along said longitudinal direction, said beam having a plane of polarization which is initially oriented along the plane of polarization of the laser;

a rotator disposed in said housing in front of the laser for rotating the plane of polarization of said beam through about 45° in one direction so as to orient said plane along an outlet plane of polarization;

a focusing lens disposed inside said housing in front of said laser for injecting said beam into the inlet of a light guide; and a polarizer disposed between said rotator and said guide to be coupled in order to selectively pass light which is polarized along said outlet plane of polarization, thereby allowing said useful light to pass and polarizing any interfering light travelling in the reverse direction along said outlet plane of polarization so that said rotator causes the plane of polarization of said interfering light to rotate through about 45° in said direction so that said light reaches said laser with a plane of polarization which is substantially perpendicular to the said plane of polarization of the laser.

Prior heads of this type are described in the following articles:

"Distributed feedback laser diode (DFB-LD) to single-mode fiber coupling module with optical isolator for high bit rate modulation", by Toshihiko Sugie and Masatoshi Saruwatari, in Journal of Lightwave Technology, Vol. LT-4, No. 2, February 1986; and "Low-noise LD module with an optical isolator using a highly bi-substituted garnet film", by K. Matsuda, H. Minemoto, K. Toda, O. Kamada, S. Ishizuka, in Electronics Letters, Feb. 26, 1987, Vol. 23, No. 5.

A drawback of these prior heads is that they are constituted by an optical system having four elements (first lens-rotator-second lens-polarizer) or having three elements (lens-rotator-polarizer) inserted between the laser and the fiber. This gives rise to major difficulties in implementation (positioning and adjusting these various parts in order to ensure minimum insertion loss and sufficient isolation).

Another drawback is that the numerous interfaces encountered by the light in the optical head tend to increase the fraction of the light which is reflected into the laser.

The aims of the present invention include, in particular, simplifying the construction and adjustment of an optical head having an integrated isolator, and/or reducing the bulk of said head together with the number of interfaces that are liable to give rise to interfering back reflection.

SUMMARY OF THE INVENTION

An optical head of the invention includes the above-mentioned items in common, and, in the context of the above-mentioned aims, it is characterized by the fact that said polarizer is a polarizing guide constituted by a length of light guide and is connected to said guide to be coupled.

The polarizing guide may be constituted by a polarizing fiber, for example.

The polarizing fiber is preferably fixed to a front wall of said housing.

A first optical head may be implemented in accordance with the present invention by including only those items which are mentioned above, i.e., in particular, including only one rotator. It may advantageously be utilized in certain transmission networks using coherent detection.

However, it should be understood firstly that the interfering light is allowed to return towards the laser, albeit with a plane of polarization which is perpendicular to that of the laser so the laser is relatively insensitive thereto, and secondly that the rotators and the polarizers are not perfect and that some of the light they allow to return to the laser has a plane of polarization which is parallel to that of the laser, in particular in the event of temperature variation.

Unfortunately, in transmission networks using coherent detection, it is often necessary to use optoelectronic sources having particularly narrow spectrum line widths, e.g. not greater than about 1 MHz.

In order to obtain satisfactory stability at such line widths, a particularly high level of optical isolation is required. It should typically be greater than 35 dB. In some cases, 50 dB to 60 dB of isolation may be necessary.

That is why a second prior optical head includes, in addition to the said items in common, a second rotator preceded by an intermediate polarizer. The intermediate polarizer receives and transmits the useful light leaving the previously mentioned rotator which then constitutes a first rotator. The second rotator serves to rotate the light's plane of rotation through 45° in the same direction as the first. Heads analogous to this second prior optical head are described in the following two articles:

"Extremely low noise characteristics of DFB laser module with doubled optical isolated scheme", by T. Uno, K. Fujito, S. Ishizuka et al., in ECOC 88, pp. 223-226; and "Cascaded optical isolator configuration having high isolation characteristics over a wide temperature and wavelength range", by Kazuo Shiraishi/Shojiro Kawakami, in Optic Letters, Vol. 12, No. 7, pp. 462-464.

For example, they may include: the laser; a first focusing lens; the first rotator; at least one intermediate polarizer; the second rotator; a final polarizer of the same type as the intermediate polarizer; and a second focusing lens.

A second optical head may be implemented in accordance with the present invention by including a second rotator preceded by an intermediate polarizer in the same way as in said second prior optical head, while nevertheless retaining the same advantages over said second prior head as are provided by the first head of the present invention compared with the first above-mentioned prior head.

BRIEF DESCRIPTION OF THE DRAWINGS

Embodiments of the invention are described by way of example with reference to the accompanying drawings, in which:

FIG. 4 is a section in a longitudinal vertical plane through the head of FIG. 2;

FIG. 5 is a block diagram of the second above-mentioned prior head;

FIG. 6 is a block diagram of the second above-mentioned head of the invention.

DETAILED DESCRIPTION

Figure 1:
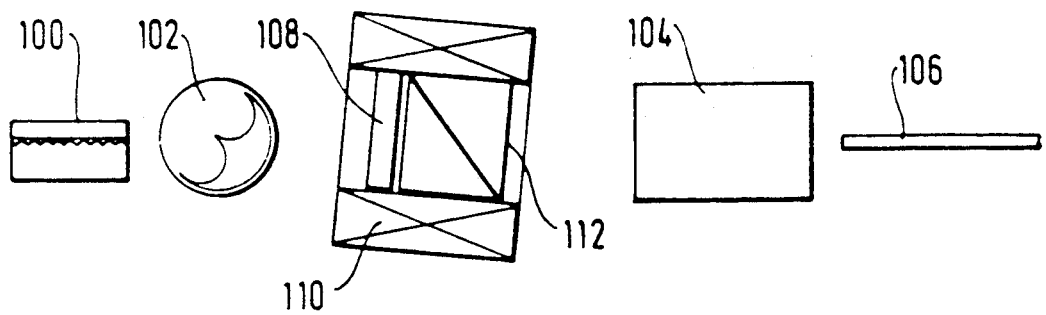
FIG. 1 is a block diagram of the first above-mentioned prior head.

As shown in FIG. 1, the first prior optical head including an integrated isolator includes the following items:

a DFB laser 100 polarized in TE mode;

a first coupling optical system 102 constituted in the case shown in FIG. 1 by a bead treated with an antireflecting coating, and serving to make the beam parallel (this optical system could equally well be constituted by a graded index lens);

a second optical system constituted by a lens 104 for refocusing the light into the core of a monomode optical fiber 106 to be coupled;

a Faraday rotator placed between the two optical systems and itself constituted by an yttrium iron garnet (YIG) bar 108, for example, having its magnetization saturated in the direction of light propagation by a permanent magnet 110; and a "Banning" type polarizer 112 placed inside the axial hole in the magnet in front of the bar 108.

Figure 2:
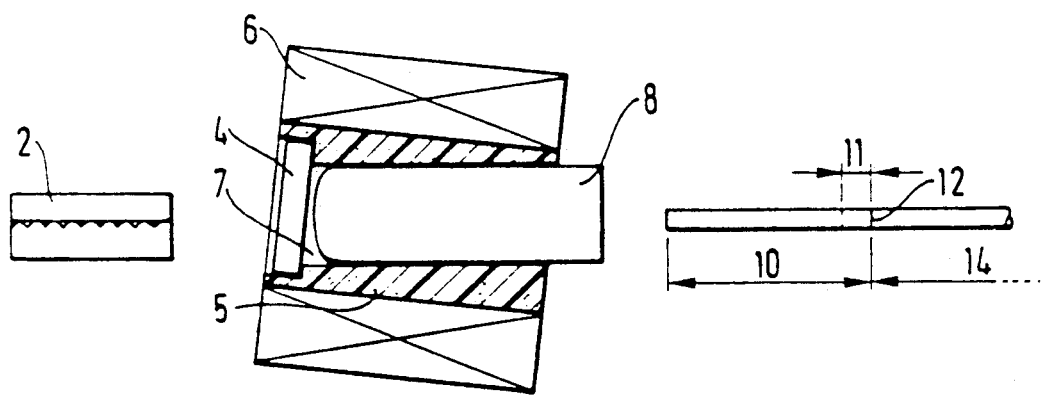
FIG. 2 shows the optical components of a first head in accordance with the invention.

FIG. 2 is a block diagram of said first head of the present invention. This head includes:

a DFB laser 2 which is polarized in TE mode;

a rotator crystal 4 constituted by a thin plate having the composition $(GdBi)_3(FeAlGa)_5O_{12}$ for use with light having a wavelength equal to 1.3 micrometers ($\mu m$) or having the composition $(YbTbBi)_3Fe_5O_{12}$ for use with light having a wavelength equal to 1.55 $\mu m$, for example;

a tubular permanent magnet 6 constituted by SmCo;

a graded index focusing lens 8; and a polarizing fiber 10 which is connected (spliced) to the fiber to be coupled 14 by means of a weld 12.

These items are used and disposed as follows:

The rotator crystal 4 and the magnet 6 constitute the said rotator which is a Faraday rotator. An axial hole 7 in the magnet extends along said longitudinal direction. The crystal is fixed facing the laser 2 in a rear portion of a sleeve 5 which is disposed in the hole. The focusing lens 8 is fixed in the front portion of the sleeve facing the polarizing fiber 10. The rotator and the lens are thus integrated in an intermediate block.

Operation is as follows:

The polarized light emitted by the laser 2 has its plane of polarization rotated through 45° on passing through the rotator. The lens 8 serves to form an image of the laser spot on the inlet face of the polarizing fiber which is oriented in such a manner as to ensure that its light-passing axis coincides with the polarization plane of the incident light.

Light reflected on the first connectors or from the end of the line is polarized after passing through the polarizing fiber. As it passes through the Faraday rotator, this reflected light has its plane of rotation rotated through 45° in the same direction as before, thereby causing the light returned to the laser to be in TM mode, and in this configuration the laser does not observe the returned noise.

The characteristics of the items used are as follows (for 1.3 $\mu m$):

DFB laser, extinction = 25 dB.

Faraday rotator:
    extinction = 40 dB
    insertion loss = 0.2 db
    magnetic field when saturated = 200 Oe;

polarizing fiber:
    extinction = 35 dB
    insertion loss = 0.2 dB;

insertion loss at the splice between the polarizing fiber and the fiber to be coupled = 0.3 dB.

Under these conditions, the typical coupling loss is about −5 dB using a semiconductor laser for which, in the far field, theta parallel = 25° and theta perpendicular = 35°. The isolation obtained is typically 25 dB.

Under these conditions, it has been shown that even when subjected to a high level of external feedback (−14 dB), the noise floor of the laser (RIN) remains below −135 dB/Hz, and this value is compatible with operation at a high data rate (error rate $10^{-9}$ at 2.3 Gb/s).

Figure 3:
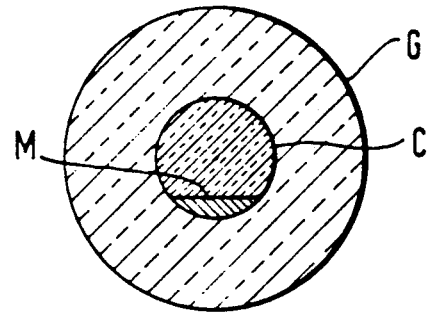
FIG. 3 is a cross-section through the polarizing fiber of the FIG. 2 head.

As shown in FIG. 3, the polarizing fiber 10 includes a metal insert M extending between its core C and its optical cladding G in order to absorb waves polarized perpendicularly to said outlet plane of polarization. In order to make it possible to form the weld 12, the insert is absent from a front length 11 of the polarizing fiber in the vicinity of the weld. In general, it appears to be preferable for the insert to be absent from the vicinity of an optical connection zone even when the connection is made other than by welding.

FIG. 4 shows how the optical components are contained in a housing 16 for the optical head. The housing has a floor 18 on which the following are fixed going from the rear towards the front:

a laser stand 20 for supporting the laser 2;

an intermediate stand 22 for supporting the intermediate block comprising the items 4, 5, 6, and 8; and a fiber stand 24 for supporting the polarizing fiber 10.

The intermediate stand 22 has a top face 23 which slopes relative to the floor 18, and a bottom face 21 of the intermediate block bears against said top face. This ensures that the main faces of the plate 4 of the rotator are inclined to avoid any reflections from these faces returning light towards the emission area of the laser 2 where it might give rise to detrimental feedback.

Assembly is performed as follows, initially outside the housing: the lens 8 and the rotator crystal 4 are brazed inside the sleeve 5 which is then inserted into the hole 7 through the permanent magnet 6. The assembly is fixed on the intermediate stand 22 and the stand is fixed to the laser stand 20 carrying the laser 2 after adjustment controlled by measuring the optical coupling. In addition, the polarizing fiber 10 is placed inside a tube 26.

Adjustment then continues as follows, where Z is the longitudinal direction, and X and Y are two transverse directions.

The assembled laser stand 20 and intermediate stand 22 is displaced in the X and Y directions relative to the fiber stand 24 by means of a micromanipulator while continuing to measure optical coupling. The tube 26 is placed in a V-groove on the fiber stand 24 and it is displaced in the Z direction as well as being rotated about its axis which extends along the Z direction.

When optimum coupling is obtained, the tube 26 is welded to the fiber stand by means of a YAG laser. The fiber stand and the intermediate stand are fixed in the optimum positions by welding using a YAG laser.

The front end of the fiber 10 projecting from the tube 26 is then curved and inserted from the inside of the housing 16 into an outlet barrel 28 that passes through the front wall 30 of the housing. The stands 20, 22, and 24 are fixed to the floor 18, e.g. via a temperature regulation module 32.

The tube 26 carried by the stand 24 is short enough to be contained inside the housing.

As shown in FIG. 5, the second above-mentioned prior head comprises:

a DFB laser 300;

a first lens 302;

a first polarizer 304;

a first Faraday rotator constituted by a plate 306 subjected to the field of a permanent magnet 308;

second and third polarizers 310 and 312;

a second Faraday rotator constituted by a plate 314 in the field of a magnet 316;

a fourth polarizer 318; and a second focusing lens 320 for refocusing the light into the core of an optical fiber 322 to be coupled.

The second head of the invention is generally analogous to the first, except that it has a second rotator and an intermediate polarizer. As shown in FIG. 6, it comprises:

a DFB laser 202 polarized in TE mode;

a first Faraday rotator whose crystal plate 204 has the same compsition as mentioned for the plate 4, and is subjected to the field of a magnet 206;

a graded index focusing lens 208;

an intermediate polarizer 244 constituted by a mini-polarizer of the "Banning" type as described in French patent application number 88 04 671 and American patent application, Ser. No. 333 151;

a second Faraday rotator similar to the first having a plate 240 and a magnet 246; and a polarizing fiber 210.

Operation is as follows:

The polarized light beam emitted by the laser has its plane of polarization rotated a first time through 45° on passing through the first rotator 204, 206.

The lens 208 serves to form an image of the laser spot on the inlet face to the polarizing fiber 210. The "Banning" type polarizer 244 has its light-passing axis aligned to pass the light delivered by the first rotator.

The polarization of the light is rotated a second time on passing through the second Faraday rotator 240, 246 (thereby moving it to 90° relative to its initial plane of polarization).

Finally, the light is focused on the inlet face of the polarizing fiber whose light-passing plane is oriented to coincide with the plane of polarization of the incident light.

Any light reflected on the first connectors or from the end of the line is polarized after passing back through the polarizing fiber. Its plane of polarization is rotated through 45° in the same direction as before as it passes through the second Faraday rotator, thereby causing its plane of polarization to be aligned with the "blocking" axis of the polarizer 244. The residual light whose plane of polarization is parallel to the light-passing axis of the polarizer 244 has its plane of polarization further rotated through 45° so as to be polarized in the TM mode of the laser, with the laser having very little sensitivity to phase noise in this configuration.

Figure 7:
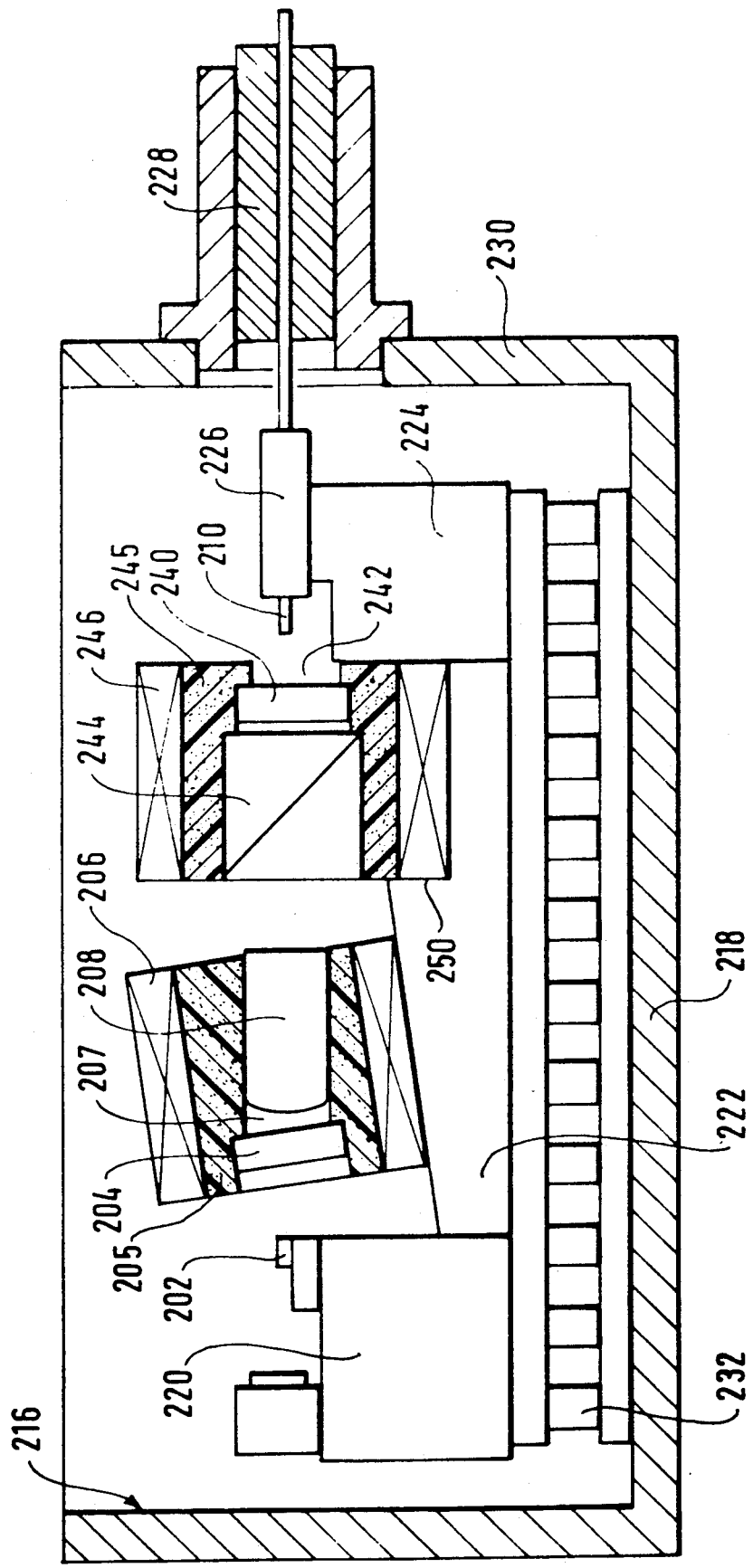
FIG. 7 is a section in a longitudinal vertical plane through the head of FIG. 6.

As shown in FIG. 7, this second laser head of the invention comprises a housing 216 having a floor 218 supporting, from its rear end to its front end:

a laser stand 220 for supporting said laser 202;

an intermediate stand 222 for supporting a first intermediate block comprising said rotator 204, 206 and said focusing lens 208, and a second intermediate block comprising said intermediate polarizer 244 and said second rotator 240, 246; and a fiber stand 224 for supporting one end of said polarizing fiber 210;

said housing also having a front wall 230 for carrying said polarizing fiber at a distance from said end thereof.

In each of the intermediate blocks, the rotator is a Faraday rotator constituted by a thin plate of a rotating crystal 204 or 240 together with a permanent magnet 206 or 246 which is tubular in shape having an axial hole 207 or 242 extending along said longitudinal direction.

The thin plate 204 of the first rotator is fixed in a rear portion of a sleeve 205 fitted in the hole 207 of said first rotator and disposed facing the laser 202 at a slope relative to the useful light beam. The focusing lens 208 is fixed in the front portion of said sleeve facing the second intermediate block. The thin plate 240 of the second rotator is disposed in the front portion of the sleeve 205 provided in the hole 242 of the second rotator and is disposed facing the polarizing fiber 210. The intermediate polarizer 244 is a Banning polarizer fixed in a rear portion of said sleeve facing the focusing lens 208.

Assembly is performed as follows, initially outside the housing: the lens 208 and the rotating crystal 204 are brazed in the sleeve 205 which is in turn inserted in the hole 207 through the permanent magnet 206; the polarizer 244 and the rotating crystal 240 are fixed in the sleeve 245 which is in turn inserted in the hole 242 in the permanent magnet 246.

The first intermediate block is fixed on the intermediate stand 222 which is fixed to the laser stand 220 carrying the laser 204 after adjustment controlled by measuring the optical coupling.

The second intermediate block is disposed in a notch 250 provided for this purpose in the intermediate stand 222 and is fixed thereto after adjustment by rotating it about its axis, with the adjustment being controlled by measuring the optical isolation obtained on light backscattered towards the laser.

The polarizing fiber 210 is placed inside a tube 226.

The polarizing fiber 210 is adjusted in position and then fixed relative to the assembly then constituted by the two intermediate blocks and the laser 202 mounted on the fixed-together stands 222 and 220 in much the same manner as the polarizing fiber 10 is positioned relative to the intermediate block and the laser 2 mounted on the fixed-together stands 22 and 20, as described with reference to the optical head shown in FIG. 4.

Similarly, the resulting assembly is mounted in the housing 216 in much the same manner as the assembly obtained for the optical head shown in FIG. 4 is mounted in the housing 16. Only a short length of the polarizing fiber 210 is disposed inside the tube 226 inside the housing 216, and the remainder thereof passes along the outlet barrel 220 which passes through the front wall 230 of the housing 216. The stands 220, 222, and 224 are fixed to the floor 218, e.g. via a temperature regulation module 232.

The advantages of the heads of the invention are as follows:

because of the reduced number of optical components used in the device, the number of internfaces is reduced, thereby reducing the number of internal reflections on the components of the device; in addition, by having a Faraday rotator at the first interface, isolation is obtained relative to reflections from the following interfaces;

the reduced number of components also reduces losses due to internal absorption and the risks of additional losses due to possible misalignment of the parts, thereby improving coupling losses; and bulk is reduced, thereby obtaining a device which is more compact, and compactness is important in obtaining mechanical and thermal stability.

We claim:

1. An optical head with an integrated isolator for coupling a semiconductor laser to a light guide constituting a guide to be coupled and included in a guided-light telecommunications systems; said head comprising:
   a housing having a longitudinal direction with a front end and a rear end;
   said semiconductor laser disposed inside said housing in order to emit a beam of useful light forwards along said longitudinal direction, said beam having a plane of polarization which is initially oriented along the plane of polarization of the laser;
   a rotator disposed in said housing in front of the laser for rotating the plane of polarization of said beam through about 45° in one direction so as to orient said plane along an outlet plane of polarization;
   a focusing lens disposed inside said housing in front of said laser for injecting said beam into the inlet of a light guide; and
   a polarizer disposed between said rotator and said guide to be coupled in order to selectively pass light which is polarized along said outlet plane of polarization, thereby allowing said useful light to pass and polarizing any interfering light travelling in the reverse direction along said outlet plane of polarization so that said rotator causes the plane of polarization of said interfering light to rotate through about 45° in said direction so that said light reaches said laser with a plane of polarization which is substantially perpendicular to said plane of polarization of the laser;
   wherein said polarizer is a polarizing guide constituted by a length of optical fiber forming a light guide and is connected to said guide to be coupled;
   said rotator is a Faraday rotator constituted by a thin plane of a rotating crystal and by a permanent magnet which is tubular in shape having an axial hole extending along said longitudinal direction, said plate being fixed in a rear portion of said hole facing said laser, with said focusing lens being fixed in a front portion of said hole facing said polarizing guide, and wherein said housing has a floor carrying, from the rear end to the front end:
   a laser stand carrying said laser and having a transverse front face which is plane;
   an intermediate stand carrying said permanent magnet, said intermediate stand having a transverse front face which is plane, and a transverse rear face which is plane and which bears against said front face of said laser stand; and
   a guide stand carrying one end of said polarizing guide, said guide stand having a transverse rear face bearing against said front face of said intermediate stand so as to facilitate adjusting and maintaining the relative positions of said stands; and
   said housing also having a front wall supporting said polarizing guide at a distance from said one end thereof.

2. An optical head with an integrated isolator for coupling a semiconductor laser to a light guide constituting a guide to be coupled and included in a guided-light telecommunications systems, said head comprising:
   a housing having a longitudinal direction with a front end and a rear end;
   said semiconductor laser disposed inside said housing in order to emit a beam of useful light forwards along said longitudinal direction, said beam having a plane of polarization which is initially oriented along the plane of polarization of the laser;
   a rotator disposed in said housing in front of the laser for rotating the plane of polarization of said beam through about 45° in one direction so as to orient said plane along an outlet plane of polarization;

a focusing lens disposed inside said housing in front of said laser for injecting said beam into the inlet of a light guide; and a polarizer disposed between said rotator and said guide to be coupled in order to selectively pass light which is polarized along said outlet plane of polarization, thereby allowing said useful light to pass and polarizing any interfering light travelling in the reverse direction along said outlet plane of polarization so that said rotator causes the plane of polarization of said interfering light to rotate through about 45° in said direction so that said light reaches said laser with a plane of polarization which is substantially perpendicular to said plane of polarization of the laser;

wherein said polarizer is a polarizing guide constituted by a length of optical fiber forming a light guide and is connected to said guide to be coupled, and said optical head further comprising:

a second rotator disposed inside said housing between the previously-mentioned rotator which then constitutes a first rotator and the previously-mentioned polarizer which then constitutes a final polarizer, said second rotator serving to further rotate the plane of polarization of beam through about 45° in said direction so as to orient the plane of polarization along said outlet plane;

an intermediate polarizer disposed between said first and second rotators for selectively passing said useful light leaving said first rotator.

wherein said housing has a floor carrying, from rear to front:

a laser stand for carrying said laser;

an intermediate stand for carrying a first intermediate block comprising said first rotator and said focusing lens, and a second intermediate block comprising said intermediate polarizer and said second rotator;

a guide stand for carrying one end of said polarizing guide; and said housing also having a front wall supporting said polarizing guide at a distance from said one end thereof.

3. A head according to claim 2, wherein in each of said intermediate blocks said rotator is a Faraday rotator constituted by a thin plate of a rotating crystal and a tubular permanent magnet having an axial hole extending along said longitudinal direction, said thin plate of said first rotator being fixed in a rear portion of said hole in said first rotator facing said laser and sloping relative to said useful light beam, with said focusing lens being fixed in a front portion of said hole facing said second intermediate block, said thin plate of said second rotator being fixed in a front portion of said hole of said second rotator facing said polarizing fiber, and said intermediate polarizer being a Banning polarizer fixed in a rear portion of said hole facing said focusing lens.

* * * * *